Figure 3:
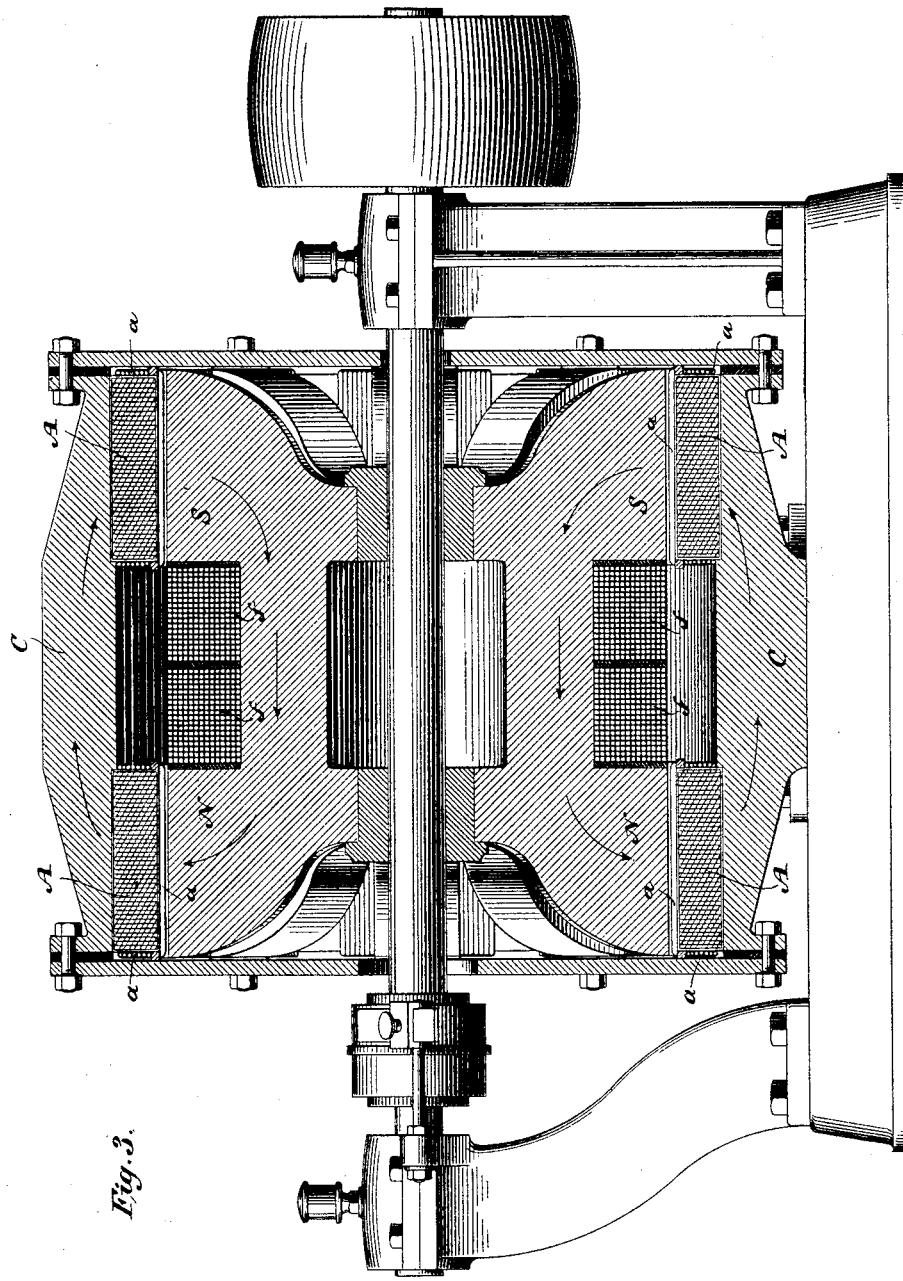

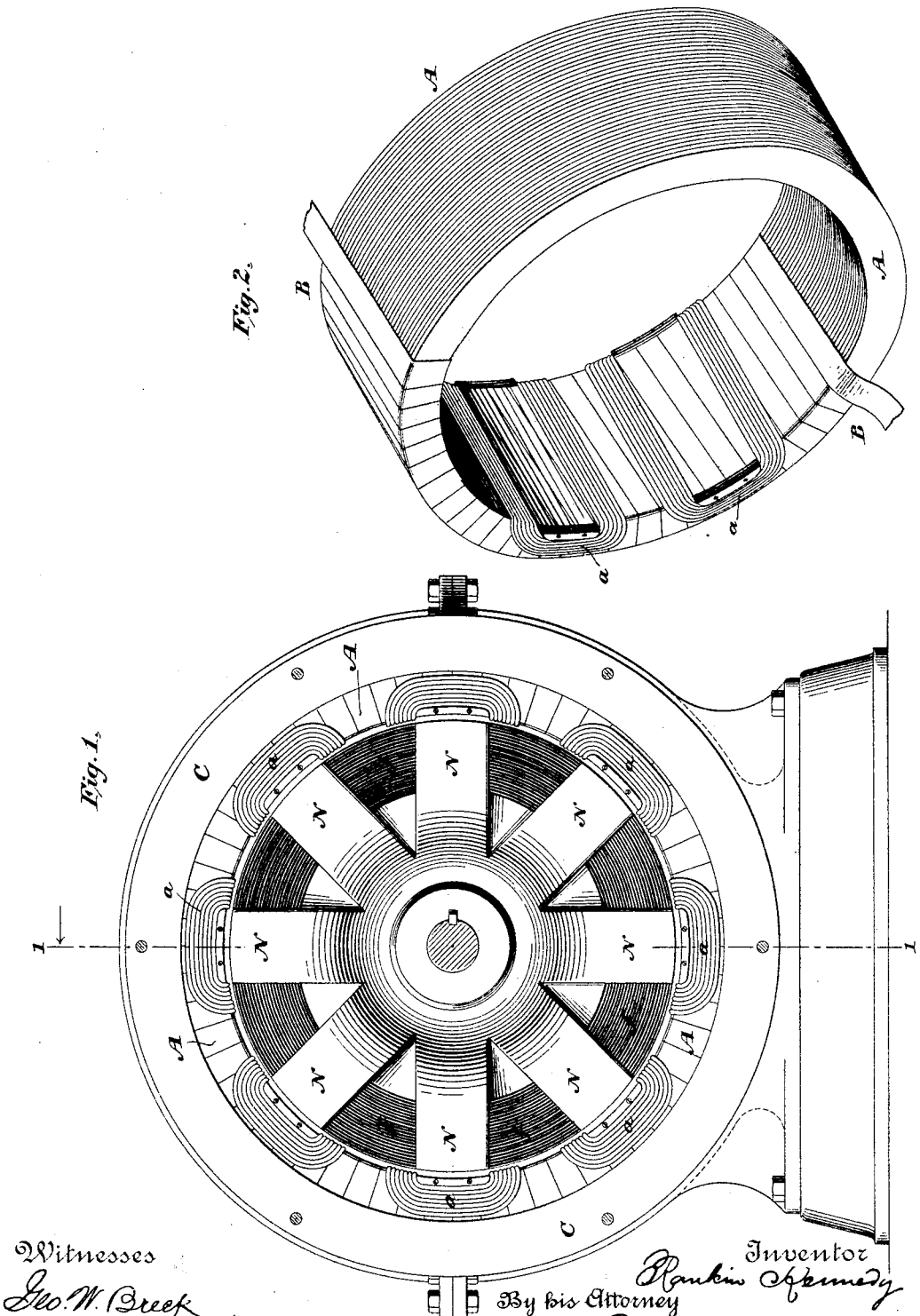

(No Model.) 2 Sheets—Sheet 2.

R. KENNEDY.
DYNAMO ELECTRIC MACHINE.

No. 461,140. Patented Oct. 13, 1891.

Witnesses
Geo. W. Breck.
Henry W. Lloyd.

Inventor
Rankin Kennedy
By his Attorney
Franklin L. Pope.

UNITED STATES PATENT OFFICE.

RANKIN KENNEDY, OF KILMARNOCK, SCOTLAND.

DYNAMO-ELECTRIC MACHINE.

SPECIFICATION forming part of Letters Patent No. 461,140, dated October 13, 1891.

Application filed October 30, 1890. Serial No. 369,771. (No model.)

*To all whom it may concern:*

Be it known that I, RANKIN KENNEDY, a subject of the Queen of Great Britain, residing at Kilmarnock, in the county of Ayr, Scotland, have invented certain new and useful Improvements in Apparatus for Magnetic Circuits of Dynamo-Electric Machinery, of which the following is a specification.

In dynamo-electric machinery according to this invention the magnetic circuit is formed of two laminated armature-cores, an iron multipolar electro-magnet, and an outer cylindrical iron casing or shell. The multipolar field-magnet may have any number of poles, but requires only one or two exciting-coils—one coil if separately excited, two coils if self-excited by rectified unidirection pulsating currents. The field-magnet is preferably straight, its ends being formed into as many poles as required, all the north poles being radially grouped at one end and all the south poles being similarly grouped at the other end. One of the laminated armature-cores encircles the south poles only and the other the north poles only. One core is fitted into one end of the outer shell or cylindrical iron casing and the other core into the other end of said casing, and both are fixed therein. The field-magnet is keyed to the shaft, and revolves inside of the circle formed by the armatures.

As a motor designed for operation by alternating currents may with advantage embody my improvements in the construction of its magnetic circuit, the invention is equally applicable to both alternating generators and alternating motors. Such machines are preferably made self-exciting by two pulsating unidirection currents flowing through separate coils on the field-magnet, as more fully set forth and described in a specification filed by me September 24, 1890, and designated as Serial No. 366,007, to which reference is had.

The generating-coils on the armatures are as many in number as there are poles on the field-magnet. The currents generated in one armature may be added either in series with or in parallel to the currents generated in the other armature by setting the coils of the one in such relation to the coils of the other that the currents are synchronous in phase. Currents from each armature may be taken separately and at any phase of difference between them by placing the center line of the coils of one armature the required angular distance in advance of the center line of the coils of the other armature. Loss by magnetic hysteresis is reduced to a minimum, as there are no reversals of magnetic flow in the circuit. Magnetic leakage is prevented by constructing the field-magnet so that all the north poles are at one end and all the south poles at the other end, with the exciting coil or coils between, and then inclosing the whole in an external iron shell or casing. The generation of waste currents in the magnetic circuit is prevented by making the laminated armature-cores deep enough radially to allow of the magnetic flow spreading out to a uniform density before it passes from the core to the outer iron shell, so that only the inner periphery of the cores where the coils of insulated wire are placed to generate current is subjected to the variations of magnetic flow. The radial depth of the armature-cores should be at least equal to half the breadth (in a circumferential direction) of the polar faces. Upon the armature are fixed rectangular coils of wire equal in number to the number of poles of the field-magnet. These coils are laid at equal intervals and are situated at such distance apart that the inner face of the armature is crossed transversely by equidistant bands or groups of wires, such groups being equal in number to twice the number of field-poles and each such group being half of one of the coils.

In the accompanying drawings, Figure 1 is an end elevation of a dynamo-electric machine embodying my invention. Fig. 2 is a perspective view of the laminated iron core of the armature, showing the details of its construction. Fig. 3 is a section through the magnet in a vertical plane parallel to its axis, showing the direction of the flow through the magnetic circuit.

In my apparatus the current induced in the coils is due to the alternate introduction and withdrawal of the magnetic flow through the coils as the magnet revolves. When the poles N N S S, &c., Figs. 1 and 2, come opposite the coils, the coils receive the whole magnetic flow. When the poles are passing between the coils, the coils receive no magnetic flow. The result of this action induces an alternating current in the coils in a manner well understood.

The peculiar form of my multipolar rotating field-magnet will be clearly seen by reference to Figs. 1 and 3. It may be described as consisting of a cylindrical central portion or hub keyed upon a freely-rotating shaft and having two sets of poles, each consisting of an equal number of radial projections N N N, &c., and S S S, &c. The stationary laminated armature A is composed of wires, rods, or strips of iron sufficiently insulated from each other in any well-known manner to avoid the production of internal heating-currents. The laminæ or wires constituting the armature may be bound together by any suitable means—as, for example, by strong linen tape, as shown at B, in Fig. 2—before laying and affixing the coils. The wire forming the field-coils is wound circularly in the space between the two series of radial projections, as seen at $ff$ in Figs. 1 and 3. The passage of a unidirection current, either continuous, intermittent, or pulsatory, causes the radial poles N N N to assume north polarity and the similar poles S S S to assume south polarity.

The manner of winding the armature-coils $a\ a\ a$, &c., is clearly shown in all the figures.

The outer iron casing or shell C, Figs. 1 and 3, serves to complete the magnetic circuit and to concentrate the lines of force or magnetic flow within the space occupied by the armature-coils $a\ a\ a$, &c.

I claim as my invention—

1. In a dynamo-electric machine or motor, the combination of a field-magnet having multiple poles disposed in two groups of opposite polarities, each of said groups being composed of a plurality of radial polar extensions, two annular laminated armatures having a radial thickness not less than half the breadth of the faces of the radial poles, and a cylindrical iron shell inclosing and supporting said armatures and serving to concentrate the magnetic lines, as set forth.

2. In a dynamo-electric machine or motor, the combination of a field-magnet having multiple poles disposed in two groups of opposite polarities, each of said groups being composed of a plurality of radial polar extensions, an annular laminated armature encircling each of said sets of poles in close proximity to their respective polar surfaces, and a circumferential magnetizing-coil situated in a plane between the sets of radial poles of said field-magnet, whereby one of said armatures is acted upon by poles of opposite polarity from the poles which act upon the other.

Dated this 3d day of September, 1890.

RANKIN KENNEDY.

Witnesses:
 JOHN STEWART,
 JOHN ROBERTSON,
  *Law Apprentices, Kilmarnock.*